US008194677B2

(12) United States Patent
Ahn

(10) Patent No.: US 8,194,677 B2
(45) Date of Patent: Jun. 5, 2012

(54) SYSTEM FOR SETTING AN AD-HOC NETWORK FOR TERMINAL AND METHOD OF CONTROLLING THE SAME

(75) Inventor: Joong-Kyu Ahn, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 26 days.

(21) Appl. No.: 12/350,587

(22) Filed: Jan. 8, 2009

(65) Prior Publication Data
US 2009/0185570 A1 Jul. 23, 2009

(30) Foreign Application Priority Data
Jan. 21, 2008 (KR) .......................... 10-2008-0006321

(51) Int. Cl.
*H04L 12/58* (2006.01)
*B60Q 1/00* (2006.01)
*G08G 1/16* (2006.01)
(52) U.S. Cl. ................... 370/395.21; 370/476; 340/436; 340/903
(58) Field of Classification Search .......... 370/276–278, 370/310, 310.2, 311, 318, 328, 331–348, 370/395.21, 476; 455/73, 552.1, 574, 452.2; 340/436, 903
See application file for complete search history.

(56) References Cited

U.S. PATENT DOCUMENTS

| 6,985,089 | B2* | 1/2006 | Liu et al. ..................... 340/903 |
| 7,330,472 | B2* | 2/2008 | Kowalski ................. 370/395.21 |
| 7,362,731 | B2* | 4/2008 | Vinayakray-Jani ........... 370/331 |
| 7,447,526 | B2* | 11/2008 | Kim et al. ..................... 455/574 |
| 7,542,728 | B2* | 6/2009 | Bitran et al. .................... 455/73 |
| 7,986,247 | B2* | 7/2011 | Bauer et al. .................... 340/905 |
| 7,991,551 | B2* | 8/2011 | Samuel et al. .................. 701/301 |
| 7,994,942 | B2* | 8/2011 | Kim et al. ................. 340/995.19 |
| 8,046,162 | B2* | 10/2011 | Nonaka ......................... 701/423 |
| 8,072,350 | B2* | 12/2011 | Luke ............................ 340/903 |

OTHER PUBLICATIONS

C. Perkins et al., "Ad hoc On-Demand Distance Vector (AODV) Routing", memo, Jul. 2003, The Internet Society.
IEE Computer Society, "IEEE Standard for Information technology Telecommunications and information exchange between systems Local and metropolitan area networks Specific requirements—Part 11: Wireless LAN Medium Access Control (MAC) and Physical Layer (PHY) Specifications", Jun. 12, 2007, New York, NY.
D. Johnson et al., "The Dynamic Source Routing Protocol (DSR) for Mobile Ad Hoc Networks for IPv4", memo, Feb. 2007, The IETF Trust.

* cited by examiner

*Primary Examiner* — Hassan Phillips
*Assistant Examiner* — Mark A Mais
(74) *Attorney, Agent, or Firm* — Jefferson IP Law, LLP

(57) ABSTRACT

A system and method for setting an ad-hoc network in a terminal are provided. The system includes a storage unit for storing a critical value of acceleration of the terminal, an acceleration sensor for measuring the acceleration of the terminal to provide a value of the measured acceleration, and a transmission frame processor for controlling transmission of a Media Access Control (MAC) frame for setting the network depending on whether the value of the acceleration measured by the acceleration sensor exceeds the critical value of acceleration pre-stored in the storage unit. The system performs Radio Frequency (RF) control on the terminals, each of which must operate as a host and a router in the ad-hoc network, using the acceleration sensor, thereby preventing use of unnecessary resources and reducing an amount of unnecessarily broadcast frames.

7 Claims, 7 Drawing Sheets

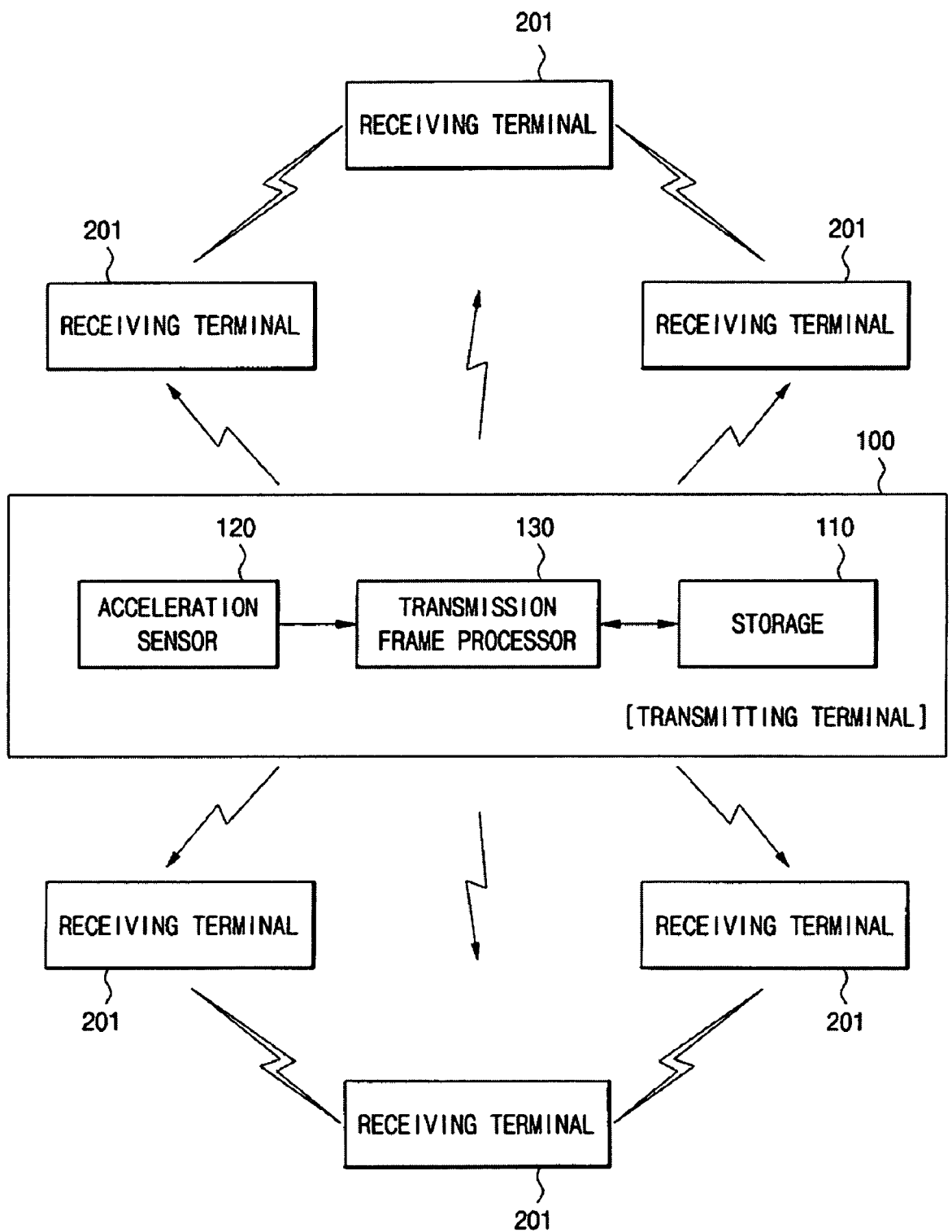

SYSTEM FOR SETTING AN AD-HOC NETWORK FOR TERMINAL AND METHOD OF CONTROLLING THE SAME

PRIORITY

This application claims the benefit under 35 U.S.C. §119 (a) of a Korean patent application filed in the Korean Intellectual Property Office on Jan. 21, 2008 and assigned Ser. No. 10-2008-0006321, the entire disclosure of which is hereby incorporated by reference.

BACKGROUND OF THE INVENTION

1. Field of the Invention

The present invention relates to an ad-hoc mode supported in a wireless network system. More particularly, the present invention relates to the enabling of a routing protocol to effectively operate in an ad-hoc mode.

2. Description of the Related Art

Among the wireless network systems, the Wireless Local Area Network (WLAN) of the Institute of Electrical and Electronics Engineers (IEEE) 802.11 standard is generally designed to support two modes of operation.

The first mode is an infrastructure mode in which terminals (e.g. stations, mobile nodes, etc.) can communicate with each other using an Access Point (AP). The other mode is an ad-hoc mode in which terminals can communicate with each other without an AP.

In the infrastructure mode, the terminals operate as hosts and the AP operates as a router that uses the same protocol as Inter AP Protocol (IAPP) of the IEEE 802.11f standard.

In contrast, in the ad-hoc mode, the terminals must directly communicate with each other because the AP is not used.

More specifically, in the ad-hoc mode each terminal must operate as a host and a router. Due to mobility and limited power that are characteristic of the terminals, the terminals based on the ad-hoc mode are distinguished from those based on the infrastructure mode.

In the ad-hoc mode, the mobility and limited power resources of any particular node (or terminal) make it difficult to communicate with the other terminals.

Thus, a special routing protocol reflecting features of the ad-hoc mode is required. Recently, a study has been made of on-demand routing protocols such as an Ad-hoc On-demand Distance Vector (ADOV) routing protocol (IETF RFC 3561) and a Dynamic Source Routing (DSR) Protocol (IETF RFC 4728). However, there remains a need for a routing protocol that addresses the needs of an ad-hoc infrastructure.

SUMMARY OF THE INVENTION

An aspect of the present invention is to address the above-mentioned problems and/or disadvantages and to provide at least the advantages described below. Accordingly, an aspect of the present invention is to provide a system for setting an ad-hoc network for a terminal and a method of controlling the same, in which, among the variable factors of ad-hoc, information about movement of the terminal is measured to efficiently control an Radio Frequency (RF), thereby making it possible for a routing protocol to operate in a more stable and efficient manner.

According to an aspect of the invention, a system for setting an ad-hoc network in a transmitting terminal is provided. The system includes a storage unit for storing a critical value of acceleration of the terminal, an acceleration sensor for measuring the acceleration of the terminal to provide a value of the measured acceleration, and a transmission frame processor for controlling transmission of a Media Access Control (MAC) frame for setting the network depending on whether the value of the acceleration measured by the acceleration sensor exceeds the critical value of acceleration pre-stored in the storage unit.

In an exemplary embodiment of the present invention, the transmission frame processor may not transmit the MAC frame if the value of the acceleration measured by the acceleration sensor exceeds the critical value of acceleration pre-stored in the storage unit, and add the value of the measured acceleration to an acceleration information field of the MAC frame and broadcast the MAC frame to surrounding receiving terminals thereof if the value of the measured acceleration does not exceed the critical value of acceleration pre-stored in the storage unit.

In another exemplary embodiment of the present invention, the transmission frame processor may use one of an automatic mode for processing the frame in a MAC layer and a manual mode for processing the frame in a routing protocol layer.

According to another aspect of the invention, a system for setting an ad-hoc network in a receiving terminal is provided. The system includes a storage unit for storing a critical value of acceleration of the terminal, an acceleration field searcher for searching an acceleration information field of a Media Access Control (MAC) frame received from any transmitting terminal and for determining a value of the acceleration information field of the MAC frame of the transmitting terminal, an acceleration comparator for comparing the value of the acceleration information field searched by the acceleration field searcher with the critical value of acceleration pre-stored in the storage unit, and a reception frame processor for discarding the received MAC frame if the value of the acceleration information field of the MAC frame is greater than the critical value of acceleration pre-stored in the storage unit.

In an exemplary embodiment of the present invention, the reception frame processor may use one of an automatic mode for processing the frame in a MAC layer and a manual mode for processing the frame in a routing protocol layer.

According to yet another aspect of the invention, a method of controlling a system for setting an ad-hoc network in a transmitting terminal is provided. The method includes measuring, by an acceleration sensor, acceleration of a transmitting terminal to provide a value of the measured acceleration, determining whether the value of the acceleration measured by the acceleration sensor exceeds a critical value of acceleration pre-stored in a storage unit and controlling transmission of a Media Access Control (MAC) frame for setting the network if the value of the measured acceleration exceeds the critical value of acceleration pre-stored in the storage unit.

In an exemplary embodiment of the present invention, the method may further include adding the value of the measured acceleration to an acceleration information field of the MAC frame and broadcasting the MAC frame to surrounding terminals if the value of the measured acceleration does not exceed the critical value of acceleration pre-stored in the storage unit.

In another exemplary embodiment of the present invention, the controlling of the transmission of a MAC frame may be carried out using one of an automatic mode for processing the frame in a MAC layer and a manual mode for processing the frame in a routing protocol layer.

According to still another aspect of the invention, a method of controlling a system for setting an ad-hoc network in a receiving terminal is provided. The method includes searching, by an acceleration field searcher, an acceleration information field of a Media Access Control (MAC) frame received from any transmitting terminal and checking a value of the acceleration information field of the MAC frame of the transmitting terminal, determining, by an acceleration comparator, whether the value of the acceleration information field searched by the acceleration field searcher is greater than a critical value of acceleration pre-stored in a storage unit, and discarding, by a reception frame processor, the received MAC frame if the value of the acceleration information field of the MAC frame is greater than the critical value of acceleration pre-stored in the storage unit.

In an exemplary embodiment of the present invention, the discarding of the received MAC frame may be carried out using one of an automatic mode for processing the frame in a MAC layer and a manual mode for processing the frame in a routing protocol layer.

As described above, according to exemplary embodiments of the present invention, the system for setting an ad-hoc network for a terminal and the method of controlling the same perform Radio Frequency (RF) control on the terminals, each of which must operate as a host and a router in the ad-hoc network, using the acceleration sensor, so that they can prevent use of unnecessary resources and reduce an amount of unnecessarily broadcast frames.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 is a functional block diagram illustrating a configuration of a system for setting an ad-hoc network for a terminal according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

Figure 2A:
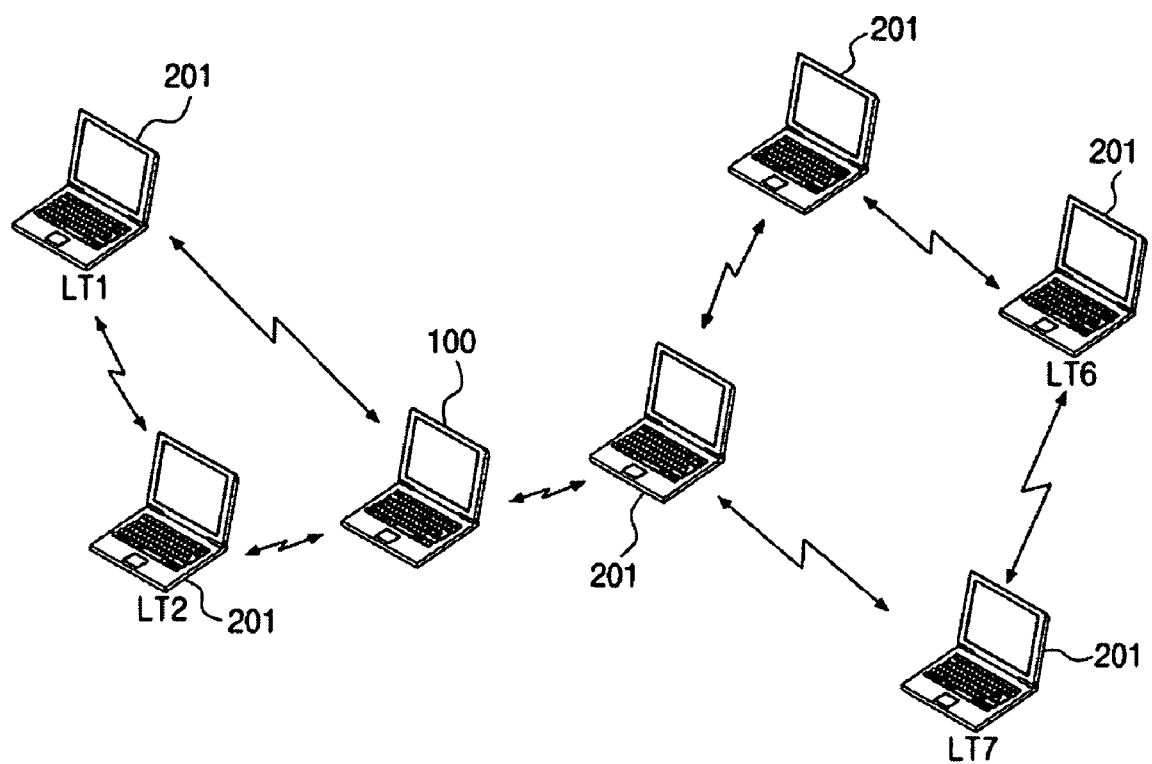
FIG. 2A illustrates a situation in which a transmitting terminal does not move around in a system for setting an ad-hoc network for a terminal according to an exemplary embodiment of the present invention.

The following description with reference to the accompanying drawings is provided to assist in a comprehensive understanding of exemplary embodiment of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 illustrates a configuration of a system for setting an ad-hoc network for a terminal according to an exemplary embodiment of the present invention. In this exemplary embodiment, the system 100 for setting an ad-hoc network for a terminal includes a storage unit 110, an acceleration sensor 120 and a transmission frame processor 130. Also illustrated in FIG. 1 is a plurality of surrounding receiving terminals 201. For sake of convenience, only six surrounding receiving terminals are illustrated and each of the surrounding receiving terminals is labeled as a terminal 201. However, this illustration is not to be considered limiting in that more or fewer terminals may surround the system 100 and the surrounding terminals need not be identical.

The storage unit 110 may store a critical or threshold value of acceleration of a transmitting terminal associated with the system 100.

The acceleration sensor 120 measures the acceleration of the transmitting terminal 100. That is, the acceleration sensor 120 determines an amount of movement of the transmitting terminal 100, for example a displacement of the terminal over a given time. The acceleration sensor 120 provides a value of the measured acceleration to the transmission frame processor 130.

The transmission frame processor 130 controls transmission of a Media Access Control (MAC) frame for setting the network depending on whether the value of the acceleration measured by the acceleration sensor 120 exceeds the critical value of acceleration. In an exemplary implementation, the critical value of acceleration is pre-stored in the storage unit 110. For example, the critical value of acceleration may be set by a terminal manufacturer. Alternatively, the critical value may be input by a user or may be received from a system administrator and may have different values depending on system parameters such as the number of surrounding terminals, channel conditions, conditions of the terminal and the like.

If the value of the acceleration measured by the acceleration sensor 120 exceeds the critical value of acceleration, the transmission frame processor 130 does not transmit the MAC frame. Alternatively, if the value of the acceleration measured by the acceleration sensor 120 exceeds the critical value of acceleration, the transmission frame processor 130 does not add the value of the measured acceleration to the MAC frame and controls transmission of the MAC frame for setting a network. In contrast, if the value of the acceleration measured by the acceleration sensor 120 does not exceed the critical value of acceleration pre-stored in the storage 110, the transmission frame processor 130 adds the value of the measured acceleration to an acceleration information field of the MAC frame, and then broadcasts the MAC frame to its surrounding receiving terminals 200 for setting an ad-hoc network. In an exemplary embodiment, the transmission frame processor 130 adds the actual value of movement or acceleration, as determined by the acceleration sensor, to the MAC frame. In another exemplary embodiment, the transmission frame processor 130 adds only an indication that the measured acceleration exceeds the critical value or not. In this case, the indication can be made using a single bit.

Figure 3:
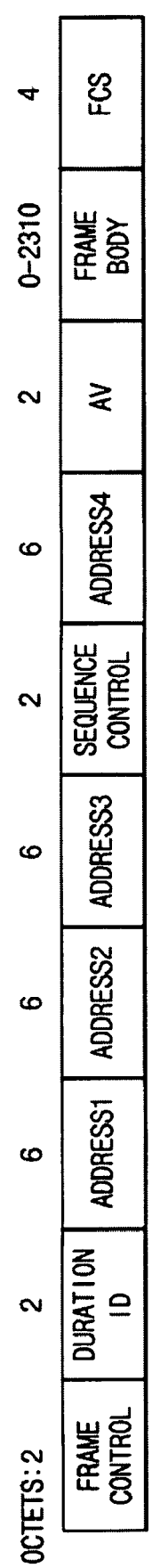
FIG. 3 illustrates a format of a MAC frame used in a system for setting an ad-hoc network for a terminal according to an exemplary embodiment of the present invention.

FIG. 3 illustrates a format of a MAC frame used in a system for setting an ad-hoc network for a terminal according to an exemplary embodiment of the present invention.

Referring to FIG. 3, the MAC frame transmitted by the transmitting terminal 100 includes a frame control field (2 bytes), a duration ID field (2 bytes), an address1 field (6 bytes), an address2 field (6 bytes), an address3 field (6 bytes), a sequence control field (2 bytes), an address4 field (6 bytes), an acceleration information field (AV) field (2 bytes), a frame body field (0 to 2310 bytes), and a Frame Check Sequence (FCS) field (4 bytes).

The transmission frame processor 130 may use one of an automatic mode for processing the frame in a MAC layer and a manual mode for processing the frame in a routing protocol layer.

Figure 2B:
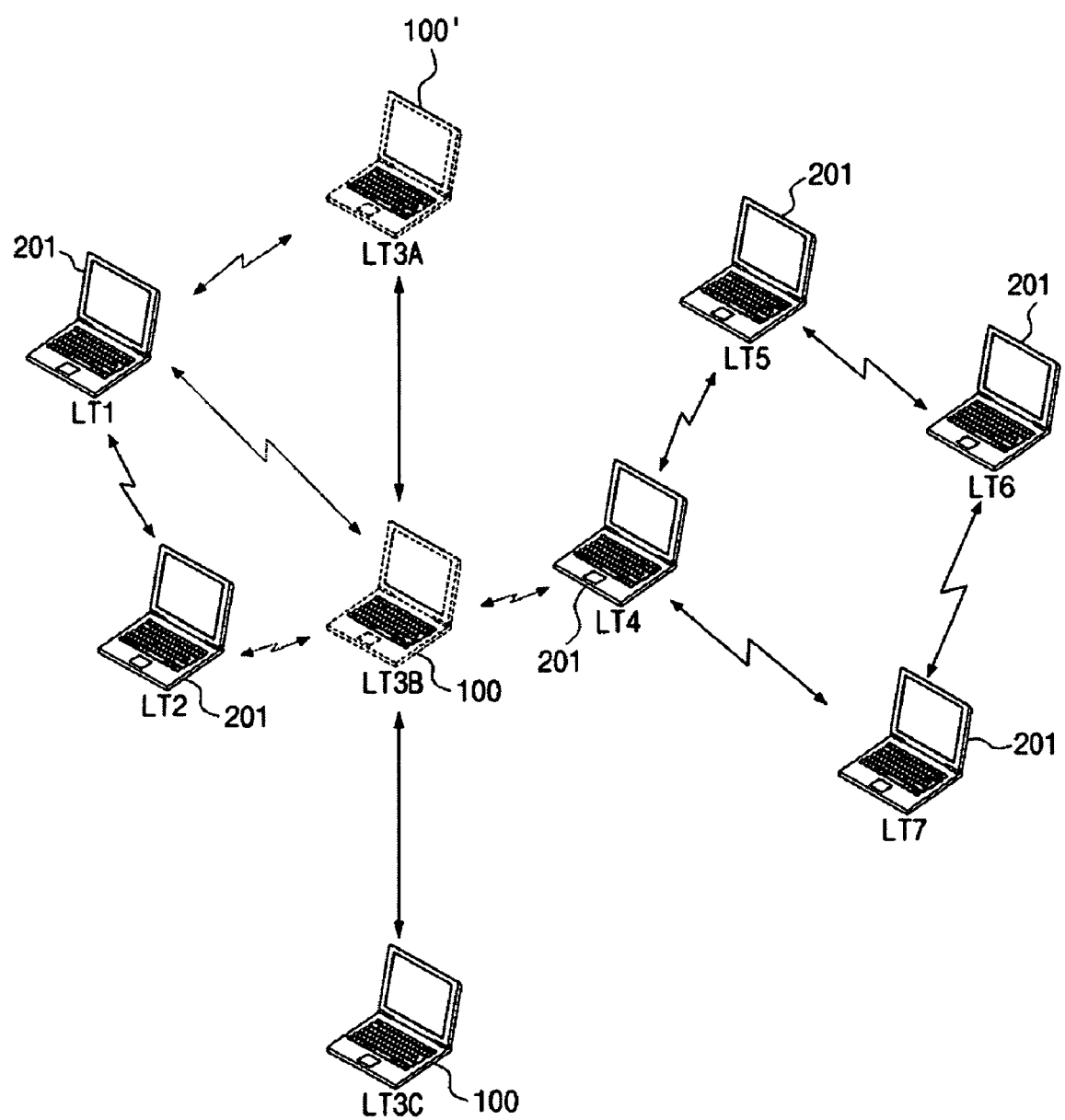
FIG. 2B illustrates a situation in which a transmitting terminal does move around in a system for setting an ad-hoc network for a terminal according to an exemplary embodiment of the present invention.

FIG. 2A illustrates a situation in which a transmitting terminal does not move around in a system for setting an ad-hoc network for a terminal according to an exemplary embodiment of the present invention and FIG. 2B illustrates a situation in which a transmitting terminal does move around in a system for setting an ad-hoc network for a terminal according to an exemplary embodiment of the present invention.

Referring to FIGS. 2A and 2B, the acceleration sensor 120 measures acceleration of the transmitting terminal 100 and provides a value of the measured acceleration to the transmission frame processor 130. In a situation in which the transmitting terminal 100 does not move around as illustrated in FIG. 2A, the value of the measured acceleration is different from the value of measured acceleration in a situation in which the transmitting terminal 100 does move around as illustrated in FIG. 2B.

The transmission frame processor 130 determines whether the value measured by the acceleration sensor 120 exceeds a critical value of acceleration and thereby controls transmission of a MAC frame for setting the network. Again, the critical value of acceleration may be pre-stored in the storage unit 110.

As illustrated in FIG. 2B, when the transmitting terminal 100 does move around to an extent that the value of the acceleration measured by the acceleration sensor 120 exceeds the critical value of acceleration, the transmission frame processor 130 does not transmit the MAC frame to its surrounding receiving terminals 201.

On the other hand, as illustrated in FIG. 2A, if the transmitting terminal does not move around or if it only moves around an amount corresponding to a value less than the critical value, the value of the measured acceleration does not exceed the critical value of acceleration. In this case, as illustrated in FIG. 3, the transmission frame processor 130 adds the value of the measured acceleration to an AV field (acceleration information field) of the MAC frame and broadcasts the MAC frame to its surrounding receiving terminals 201.

Regarding the magnitude of acceleration, as illustrated in FIG. 2B, although the transmitting terminal 100 does move around, the value of the measured acceleration may not exceed the critical value of acceleration. In this case, the transmission frame processor 130 adds the value of the measured acceleration to the AV field of the MAC frame and broadcasts the MAC frame to its surrounding receiving terminals 201.

The transmission frame processor 130 may use one of an automatic mode for processing the frame in a MAC layer and a manual mode for processing the frame in a routing protocol layer.

Figure 4:
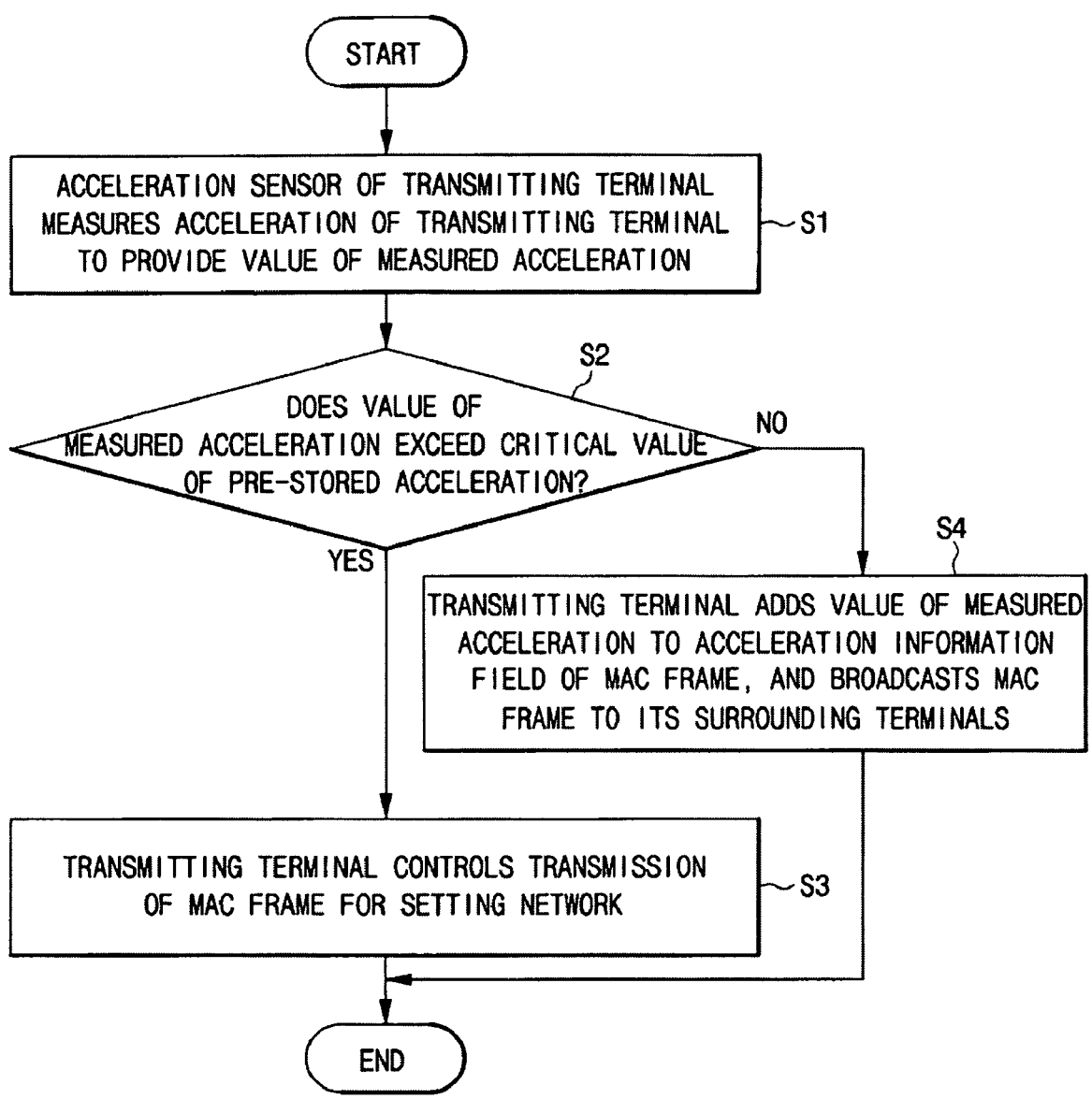
FIG. 4 is a flowchart illustrating a method of controlling a system for setting an ad-hoc network for a terminal according to an exemplary embodiment of the present invention.

FIG. 4 is a flowchart illustrating a method of controlling a system for setting an ad-hoc network for a terminal according to an exemplary embodiment of the present invention.

Referring to FIG. 4, the acceleration sensor 120 of a transmitting terminal 100 measures acceleration of the transmitting terminal 100 and provides a value of the measured acceleration to the transmission frame processor 130 in step S1.

The transmitting terminal 100 determines whether the value of the acceleration measured by the acceleration sensor 120 exceeds the critical value of acceleration in step S2.

As a result of the determination in step S2, if the value of the measured acceleration exceeds the critical value of acceleration (i.e. "Yes"), the transmitting terminal 100 controls transmission of the MAC frame for setting the network in step S3. That is, the transmitting terminal 100 transmits the MAC frame without adding the measured acceleration to the MAC frame. Alternatively, if the value of the measured acceleration exceeds the critical value of acceleration (i.e. "Yes"), the transmitting terminal 100 may simply end the procedure without transmitting the MAC frame.

In contrast, as a result of the determination in step S2, if the value of the measured acceleration does not exceed the critical value of acceleration (i.e. "No"), the transmitting terminal 100 adds the value of the measured acceleration to an AV field of the MAC frame and broadcasts the MAC frame to its surrounding receiving terminals 201 in step S4.

Here, the transmission of the MAC frame in step S3 is controlled using one of an automatic mode for processing the frame in a MAC layer and a manual mode for processing the frame in a routing protocol layer.

Figure 5:
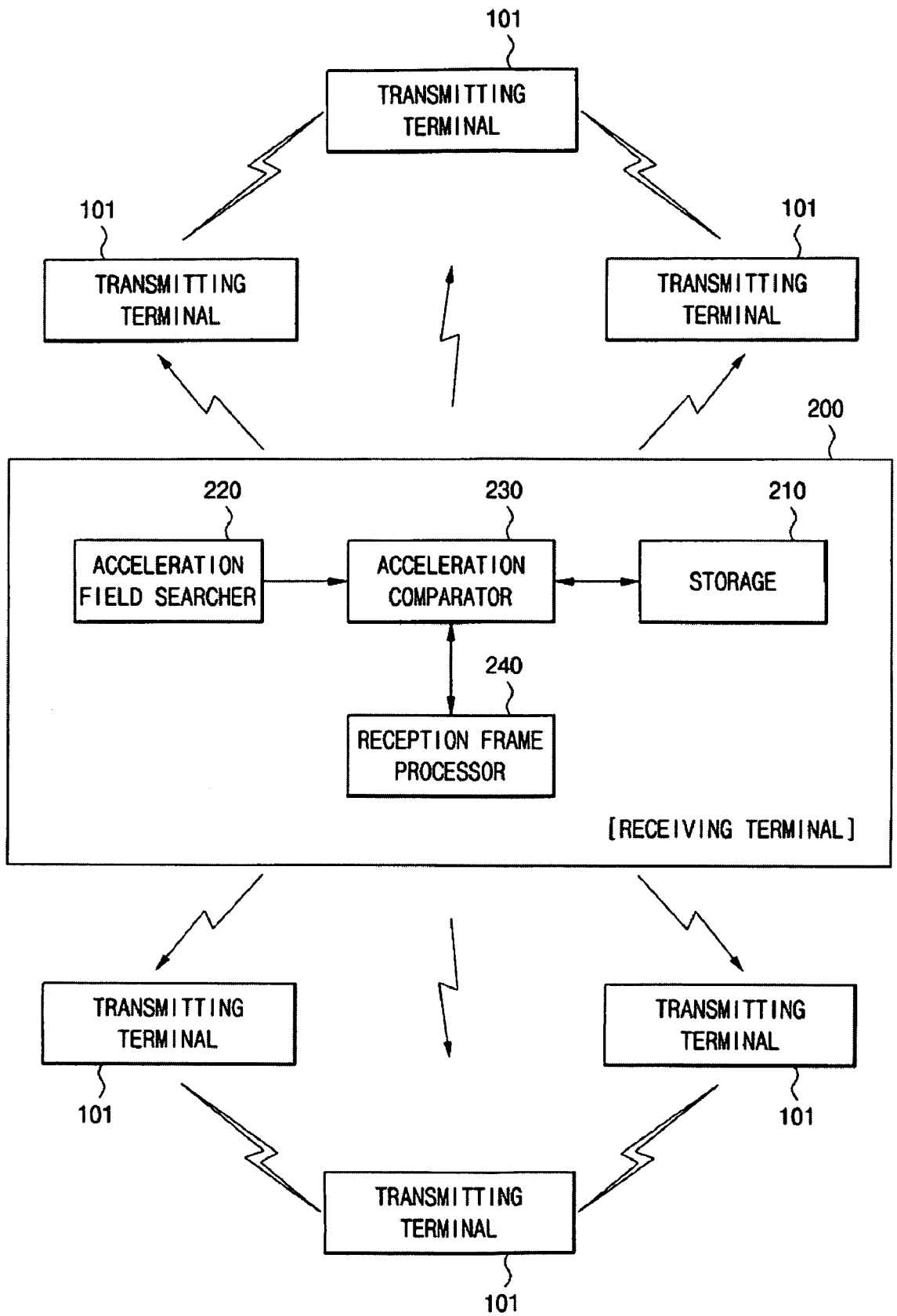
FIG. 5 is a functional block diagram illustrating a configuration of a system for setting an ad-hoc network for a terminal according to an exemplary embodiment of the present invention.

FIG. 5 is a functional block diagram illustrating a configuration of a system for setting an ad-hoc network for a terminal according to an exemplary embodiment of the present invention.

Referring to FIG. 5, the system 200 for setting an ad-hoc network for a terminal includes a storage unit 210, an acceleration field searcher 220, an acceleration comparator 230 and a reception frame processor 240. Also illustrated in FIG. 5 is a plurality of surrounding receiving terminals 101. For sake of convenience, only six surrounding receiving terminals are illustrated and each of the surrounding receiving terminals is labeled as a terminal 101. However, this illustration is not to be considered limiting in that more or fewer terminals may surround the system 200 and the surrounding terminals need not be identical.

The storage unit 210 may store a critical value of acceleration of a receiving terminal 200.

The acceleration field searcher 220 searches for the AV field of a MAC frame received from any transmitting terminal 101 and determines a value of the AV field of the MAC frame of the transmitting terminal 101.

The acceleration comparator 230 compares the value of the AV field determined by the acceleration field searcher 220 with the critical value of acceleration. In an exemplary embodiment, the critical value of acceleration is pre-stored in the storage unit 210. Alternatively, the critical value may be input by a user or may be received from a system administrator and may have different values depending on system parameters such as the number of surrounding terminals, channel conditions, conditions of the terminal and the like.

Further, the reception frame processor 240 discards the received MAC frame if the value of the AV field searched by the acceleration field searcher 220 is greater than the critical value of acceleration.

The reception frame processor 240 may use one of an automatic mode for processing the frame in a MAC layer and a manual mode for processing the frame in a routing protocol layer.

The following description of the aforementioned components will be oriented to operation associated with the subject matter of the present invention, instead of typical functions and operation.

The acceleration field searcher 220 searches for the AV field of a MAC frame received from any transmitting terminal 101 and determines a value of the AV field of the MAC frame of the transmitting terminal 101.

The acceleration comparator 230 compares the value of the AV field determined by the acceleration field searcher 220 with a critical value of acceleration.

In an exemplary embodiment, the critical value of acceleration is pre-stored in the storage unit 210.

If the value of the AV field determined by the acceleration field searcher 220 is greater than the critical value of acceleration, the reception frame processor 240 discards the received MAC frame.

In contrast, if the value of the AV field searched by the acceleration field searcher 220 is equal to or less than the critical value of acceleration, the reception frame processor 240 provides the received MAC frame to a higher layer. Of course, if the MAC frame was transmitted without a value in the AV field, the reception frame processor 240 also discards the received MAC frame.

The reception frame processor 240 may use one of an automatic mode for processing the frame in a MAC layer, and a manual mode for processing the frame in a routing protocol layer.

Figure 6:
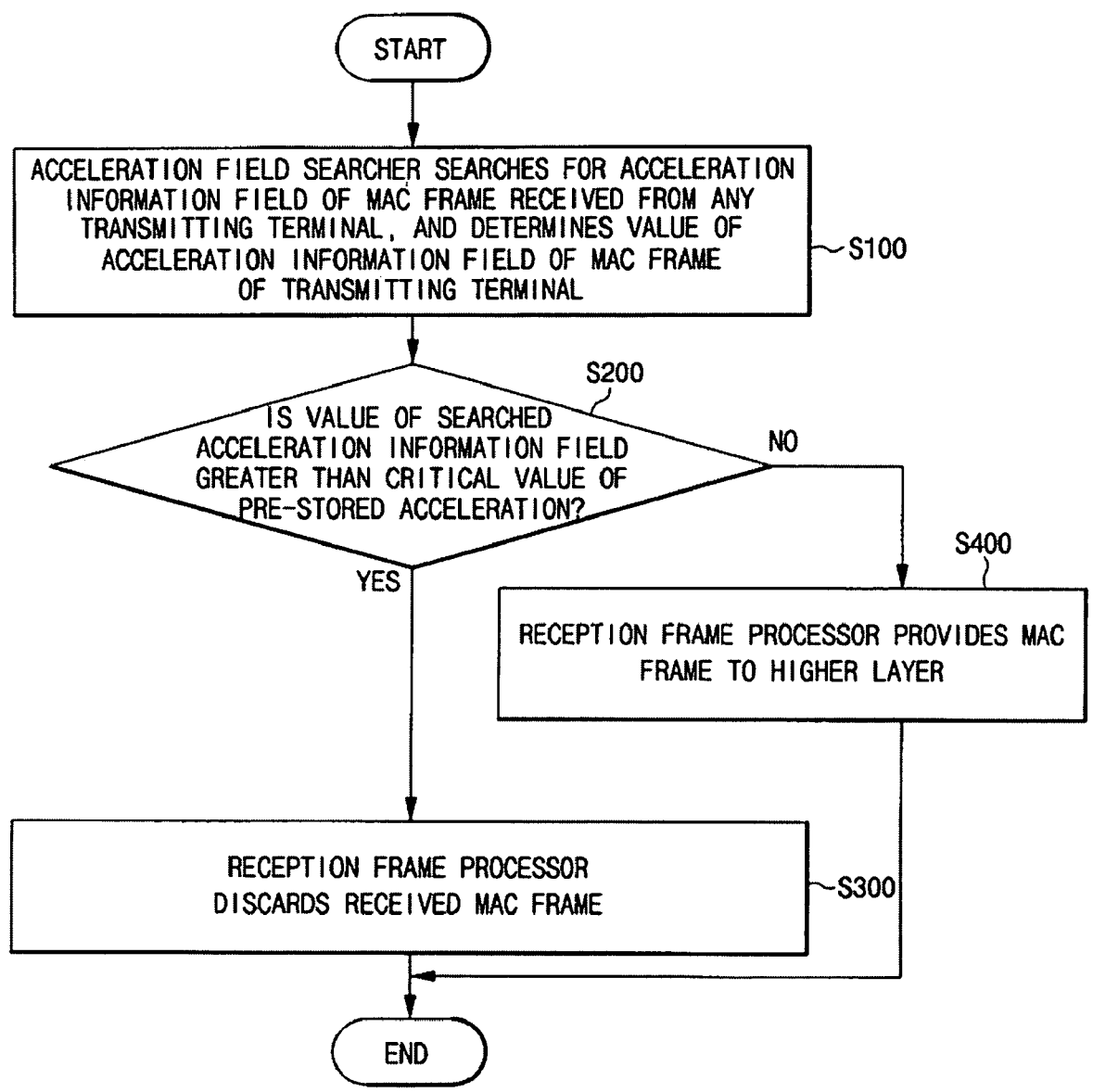
FIG. 6 is a flowchart illustrating a method of controlling a system for setting an ad-hoc network for a terminal according to an exemplary embodiment of the present invention.

FIG. 6 is a flowchart illustrating a method of controlling a system for setting an ad-hoc network for a terminal according to an exemplary embodiment of the present invention.

Referring to FIG. 6, the acceleration field searcher 220 searches the AV field of a MAC frame received from any transmitting terminal 101 and determines a value of the AV field of the MAC frame of the transmitting terminal 101 in step S100.

The acceleration comparator 230 determines whether the value of the AV field determined by the acceleration field searcher 220 is greater than a critical value of acceleration in step S200.

As a result of the determination in step S200, if the value of the AV field determined by the acceleration field searcher 220 is greater than the critical value of acceleration, the reception frame processor 240 discards the received MAC frame in step S300. Step S300 may be carried out using an automatic mode for processing the frame in a MAC layer or a manual mode for processing the frame in a routing protocol layer.

In contrast, if the value of the AV field determined by the acceleration field searcher 220 is equal to or less than the critical value of acceleration, the reception frame processor 240 provides the received MAC frame to a higher layer in step S400. Although not illustrated, if in step S100 it is determined that the AV field does not include an acceleration value, the reception frame processor 240 may proceed to step S300 and discard the received MAC frame. While the invention has been shown and described in connection with reference to certain exemplary embodiments thereof, it will be understood by those skilled in the art that various changes in form and details may be made therein without departing from the spirit and scope of the invention as defined by the appended claims and their equivalents.

What is claimed is:

1. A system for setting an ad-hoc network in a transmitting terminal, the system comprising:
 a storage unit for storing a critical value of acceleration of the terminal;
 an acceleration sensor for measuring the acceleration of the terminal and for providing a value of the measured acceleration; and
 a transmission frame processor for determining whether the value of the acceleration measured by the acceleration sensor exceeds a critical value of acceleration stored in the storage unit,
 wherein, if it is determined that the value of the measured acceleration does not exceed the critical value of acceleration stored in the storage unit, the transmission frame processor adds the value of the measured acceleration to an acceleration information field of a Media Access Control (MAC) frame and broadcasts the MAC frame to surrounding receiving terminals, and
 wherein the transmission frame processor does not broadcast any MAC frame if it is determined that the value of the acceleration measured by the acceleration sensor exceeds the critical value of acceleration stored in the storage unit.

2. The system according to claim 1, wherein the acceleration information field comprises a frame body field of the MAC frame.

3. The system according to claim 2, wherein the transmission frame processor uses one of an automatic mode for processing the MAC frame in a media access control layer and a manual mode for processing the MAC frame in a routing protocol layer.

4. A system for setting an ad-hoc network in a receiving terminal, the system comprising:
 a storage unit for storing a critical value of acceleration of the terminal;
 an acceleration field searcher for searching an acceleration information field of a Media Access Control (MAC) frame received from a transmitting terminal, and for determining a value of the acceleration information field of the MAC frame of the transmitting terminal;
 an acceleration comparator for comparing the value of the acceleration information field searched by the acceleration field searcher with a critical value of acceleration of the receiving terminal stored in the storage unit; and
 a reception frame processor for discarding the received MAC frame if the value of the acceleration information field of the MAC frame is greater than the critical value of acceleration stored in the storage unit and providing the received MAC frame to a higher layer if the value of the acceleration information field of the MAC frame is equal to or less than the critical value of acceleration stored in the storage unit.

5. The system according to claim 4, wherein the reception frame processor discards the received MAC frame using one of an automatic mode for processing the frame in a media access control layer and a manual mode for processing the frame in a routing protocol layer.

6. A method of controlling a system for setting an ad-hoc network in a transmitting terminal, the method comprising:

measuring, by an acceleration sensor, a value of acceleration of the transmitting terminal;

determining whether the value of acceleration measured by the acceleration sensor exceeds a critical value of acceleration stored in a storage unit;

adding the value of the measured acceleration to an acceleration information field of a Media Access Control (MAC) frame and broadcasting the MAC frame to surrounding terminals if it is determined that the value of the measured acceleration does not exceed the critical value of acceleration stored in the storage unit; and not broadcasting any MAC frame if it is determined that the value of the acceleration measured by the acceleration sensor exceeds the critical value of acceleration stored in the storage unit.

7. A method of controlling a system for setting an ad-hoc network in a receiving terminal, the method comprising:

searching, by an acceleration field searcher, an acceleration information field of a Media Access Control (MAC) frame received from a transmitting terminal;

determining a value of the acceleration information field of the MAC frame of the transmitting terminal;

determining, by an acceleration comparator, whether the value of the acceleration information field searched by the acceleration field searcher is greater than a critical value of acceleration stored in a storage;

discarding, by a reception frame processor, the received MAC frame if the value of the acceleration information field of the MAC frame is greater than the critical value of acceleration stored in the storage; and providing, by a reception frame processor, the received MAC frame to a higher layer if the value of the acceleration information field of the MAC frame is equal to or less than the critical value of acceleration stored in the storage unit.

* * * * *